United States Patent
Gmeiner

(10) Patent No.: US 11,951,681 B2
(45) Date of Patent: *Apr. 9, 2024

(54) METHOD AND DEVICE FOR LITHOGRAPHY-BASED ADDITIVE PRODUCTION OF THREE-DIMENSIONAL SHAPED BODIES

(71) Applicant: CUBICURE GMBH, Vienna (AT)

(72) Inventor: Robert Gmeiner, Vienna (AT)

(73) Assignee: CUBICURE GMBH, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,094

(22) Filed: Apr. 5, 2023

(65) Prior Publication Data

US 2023/0234283 A1 Jul. 27, 2023

Related U.S. Application Data

(63) Continuation of application No. 16/325,973, filed as application No. PCT/AT2017/000056 on Aug. 10, 2017, now Pat. No. 11,642,837.

(30) Foreign Application Priority Data

Aug. 18, 2016 (EP) .................... 16450019

(51) Int. Cl.
*B29C 64/129* (2017.01)
*B29C 64/124* (2017.01)
(Continued)

(52) U.S. Cl.
CPC .......... *B29C 64/129* (2017.08); *B29C 64/124* (2017.08); *B29C 64/135* (2017.08);
(Continued)

(58) Field of Classification Search
CPC ... B29C 64/129; B29C 64/124; B29C 64/135; B29C 64/20; B29C 64/214;
(Continued)

(56) References Cited

U.S. PATENT DOCUMENTS 3,960,081 A * 6/1976 Gustavs .............. B41F 23/0409
101/415.1
2015/0010461 A1 1/2015 Cronin
(Continued)

FOREIGN PATENT DOCUMENTS

EP 2505341 A1 10/2012
EP 2875934 A1 5/2015
(Continued)

OTHER PUBLICATIONS

International Search Report dated Dec. 22, 2017 issued in corresponding International Patent Application No. PCT/AT2017/00056 with English translation.

*Primary Examiner* — Charles Cai
(74) *Attorney, Agent, or Firm* — Pillsbury Winthrop Shaw Pittman, LLP

(57) ABSTRACT

In a process for the lithography-based generative production of three-dimensional shaped bodies, wherein material that is solidifiable by exposure to electromagnetic radiation is present on a material support that is permeable in at least a region thereof, a building platform is positioned at a distance from the material support, material located between the building platform and the material support is heated and in the heated state is location-selectively irradiated by a first radiation source and solidified, wherein the electromagnetic radiation is introduced into the material from below through the material support that is at least partially permeable to radiation from the first radiation source, the heating of the material is performed by irradiating the material support with electromagnetic radiation of a second radiation source, (Continued)

wherein the material support is substantially impermeable for the radiation of the second radiation source.

19 Claims, 3 Drawing Sheets

(51) Int. Cl.
*B29C 64/135* (2017.01)
*B29C 64/20* (2017.01)
*B29C 64/214* (2017.01)
*B29C 64/236* (2017.01)
*B29C 64/277* (2017.01)
*B29C 64/295* (2017.01)
*B29C 64/364* (2017.01)
*B29C 64/393* (2017.01)
*B33Y 10/00* (2015.01)
*B33Y 30/00* (2015.01)
*B33Y 50/00* (2015.01)
*B33Y 50/02* (2015.01)
*B33Y 70/10* (2020.01)

(52) U.S. Cl.
CPC ............ *B29C 64/20* (2017.08); *B29C 64/214* (2017.08); *B29C 64/236* (2017.08); *B29C 64/277* (2017.08); *B29C 64/295* (2017.08); *B29C 64/364* (2017.08); *B29C 64/393* (2017.08); *B33Y 10/00* (2014.12); *B33Y 30/00* (2014.12); *B33Y 50/00* (2014.12); *B33Y 50/02* (2014.12); *B33Y 70/10* (2020.01)

(58) Field of Classification Search
CPC ... B29C 64/236; B29C 64/277; B29C 64/295; B29C 64/364; B29C 64/393; B33Y 10/00; B33Y 30/00; B33Y 50/00; B33Y 50/02; B33Y 70/00
See application file for complete search history.

(56) References Cited

U.S. PATENT DOCUMENTS

| | | | |
|---|---|---|---|
| 2015/0344618 A1* | 12/2015 | Nicholson | ............ C08G 63/78 424/94.1 |
| 2016/0157496 A1 | 6/2016 | Nchekwube | |
| 2016/0288412 A1 | 10/2016 | Stampfl | |
| 2017/0197361 A1* | 7/2017 | Stadlmann | ............ B29C 64/25 |
| 2018/0085998 A1 | 3/2018 | Von Burg | |
| 2019/0337222 A1 | 11/2019 | Gu | |

FOREIGN PATENT DOCUMENTS

| | | |
|---|---|---|
| WO | 2015/074088 A2 | 5/2015 |
| WO | 2016/012389 A1 | 1/2016 |
| WO | 2016/078838 A1 | 5/2016 |

* cited by examiner

METHOD AND DEVICE FOR LITHOGRAPHY-BASED ADDITIVE PRODUCTION OF THREE-DIMENSIONAL SHAPED BODIES

CROSS-REFERENCE TO RELATED APPLICATIONS

This is a continuation application of U.S. application Ser. No. 16/325,973, filed Feb. 15, 2019, which is the U.S. National Stage of PCT/AT2017/000056, filed Aug. 10, 2017, which claims priority to European Patent Application No. EP 16450019.1, filed Aug. 18, 2016, and all contents of each of these applications are incorporated herein by reference in their entireties.

BACKGROUND

Field

The invention relates to method for the lithography-based generative production of three-dimensional shaped bodies, wherein material that is solidifiable by exposure to electromagnetic radiation is present on a material support that is permeable in at least a region thereof, a building platform is positioned at a distance from the material support, material located between the building platform and the material support is heated and in the heated state is location-selectively irradiated by a first radiation source and solidified, wherein the electromagnetic radiation is introduced into the material from below through the material support that is permeable in at least a region thereof to radiation from the first radiation source.

The invention further relates to a device for carrying out such a method.

DESCRIPTION OF PRIOR ART

In lithographic or stereolithographic additive manufacturing photopolymerizable starting material is processed in layers to form shaped bodies. The layer information is thereby locally and time selectively transmitted on the material to be polymerized either by an optical mask, a projected image area or by scanning by laser beam. Here, fundamental distinctions are made in the choice of the exposure and structuring methodology: on the one hand, a (dip) basin of a photopolymerizable material can be exposed to radiation from above, wherein during production the structured object is successively immersed in the liquid material (SLA), or else a material reservoir (filled material trough) is exposed to radiation from below through a transparent trough bottom, the object being withdrawn from the material bath from above (DLP, laser stereolithography). In the latter case, the object is structured layer by layer, whereby the respective distance between the object and the material trough bottom guarantees a high-precision layer thickness. In novel processes, this type of structuring can also be carried out continuously instead of in layers, in which case further special requirements must be imposed on the trough bottom.

Common to all these process methods is the high geometric quality of the additively structured products. In addition to the geometric quality of an object, its material quality is also crucial for technical applications, but also in the area of end-user products. In the case of additively processed plastics, known deficits manifest themselves above all in terms of temperature resistance (pronounced loss of rigidity/modulus of elasticity when the temperature increases, usually starting at as low as 40-50° C.) or toughness (impact strength/resistance to fatal cracking or cracking) at ambient temperature.

Novel photopolymer systems for stereolithography processes, which allow the production of shaped bodies with improved material quality, generally have a high viscosity and are therefore difficult to process. The high viscosity complicates, for example, the material feed considerably. It is therefore currently desired to use materials whose dynamic viscosity in the processing stage do not exceed the range of a few Pa·s (Pascal-seconds).

In order nevertheless to process materials with higher viscosity, it has already been proposed to conduct the process at elevated temperature. Even with a small increase in the process temperature compared to normal room temperature (20° C.), the viscosity of most photopolymers decreases significantly. This results in a considerable enlargement of the choice of available starting polymer substances which can subsequently lead to novel 3D printing materials.

In stereolithography the type of process heating constitutes a challenge, especially in the conduct of processes with the material trough being irradiated from below, if a uniform heating of the trough contents is to be achieved. WO 2015/074088 A2 discloses a method in which the heat is supplied by means of an intransparent resistance heating at the edge of the exposure zones. The disadvantage here is that large temperature gradients arise within the material trough, whereby the process control is considerably more difficult or no homogeneous material viscosity can be ensured.

WO 2016/078838 A1 discloses a method in which the heating takes place with the aid of a transparent coating of the trough bottom that is electrically conductive over the entire area and heats up when being passed by an electric current. Although this succeeds in homogenizing the heating, however, possible heating power limits are reached quickly and temperatures above 60° C. are difficult to maintain in continuous operation. To make matters worse, certain transparent electrical coatings (indium tin oxide, ITO) increasingly absorb visible light wavelengths below 450 nm and are already completely non-transparent in the region of near UV light. However, it is precisely this near UV range that is a prerequisite for efficient stereolithographic processing of plastics. This applies in particular when undyed transparent plastics are to be processed.

Another possibility of direct or indirect material heating is conceivable by thermal radiation with infrared rays. An advantage of heating by means of thermal radiation is the at least theoretically possible, high heating power which can be delivered to the material. The natural absorption of at least parts of the infrared spectrum by plastics and photopolymers can represent both the advantage just mentioned but also a decisive disadvantage: A sufficient control of the heating rate as well as of the final temperature of the reactive photopolymer to be heated is difficult to impossible. Penetrating infrared radiation is continuously absorbed by the photopolymer and thereby attenuated. In a material bath, the exposed surface and areas directly below it heat up strongly, while deeper regions remain cooler. The poor thermal conductivity of the liquid starting materials contributes decisively to an inhomogeneous temperature distribution.

In the case of heating a thin polymer layer by infrared radiation, maintaining the process temperature is a problem again: A thin layer of material cools rapidly to ambient temperature due to its extremely large surface area in relation to its volume (heat conduction to ambient air and convection). However, the thus required continuous infrared irradiation of this surface can now also lead to a very rapid local increase in the layer temperature, as a result of which a temperature-induced free-radical polymerization or other damage to the material can take place. Since the photopolymers to be processed also become considerably more reactive as a result of the temperature increase and thus carry out individual reaction steps even in the unexposed state, at least a deterioration of the process quality over time is to be assumed.

Also known are variants of stereolithography machines, which perform the structuring process in a kind of furnace, whereby the entire process zone can be heated. Although this solution is technically feasible, it requires a complex and expensive construction of the stereolithography system and requires high energy consumption during the process.

SUMMARY

The aim of the present invention is therefore to provide a technical solution which can guarantee a controlled and homogeneous heating of the photopolymer to be processed during the process and which can be implemented as easily as possible in the existing process technology.

To solve this problem, the invention provides in a method of the type mentioned above, that the heating of the material is performed by irradiating the material support with electromagnetic radiation of a second radiation source, wherein the material support is substantially impermeable for the radiation of the second radiation source.

The invention thus provides that two separate radiation sources are used, wherein the first radiation source provides for the polymerization or solidification of the solidifiable material that coats the material support and the second radiation source serves for the heating of the material support in the sense of radiant heating. The material support is designed for this purpose so that it is transparent to the radiation of the first radiation source, so that the radiation enters the material to be solidified, and that it is substantially impermeable to the radiation of the second radiation source. The radiation of the second radiation source is thus absorbed in the material support and there ensures a heating of the material support, wherein the material to be solidified is heated indirectly, namely by heat transfer by heat conduction from the material support to the material to be solidified.

The selective permeability of the material support is preferably achieved by virtue of the fact that the radiation of the first radiation source comprises a first wavelength range and the radiation of the second radiation source comprises a second wavelength range, which is different from the first wavelength range and in particular does not overlap with the same.

In particular, the radiation of the first radiation source is in the wavelength range of 200-900 nm, in particular 300-400 nm or 400-480 nm, and the radiation of the second radiation source is in the infrared spectrum, in particular in the wavelength range of 900-15.000 nm.

The material support is designed so that it is transparent or partially transparent for the radiation of the first radiation source, in particular in the range below 500 nm (blue, violet spectrum) or for radiation of the near to medium UV range in the range 300 nm-400 nm. This enables a location-selective and time-selective structuring of the photosensitive material through the material support, thereby enabling the additive manufacturing process. The selective exposure to light can take place by means of digital light processing (DLP, area exposure of a slice image), laser (scanning of the image) or other active or passive optical masks.

The controlled uniform heating of the solidifiable material should also take place mainly by heat conduction from the material support to the material itself, whereby a narrow temperature process window can be maintained over a long period of time. In this case, an infrared radiation source is preferably used to heat the material support. The material support must then be largely opaque in the spectrum of the incident infrared radiation (>900 nm) or at least absorb a range of the infrared spectrum between 900 nm and 15000 nm in order to experience significant heating. In order to avoid the problems of temperature control of the photosensitive material described in the prior art, the material support used should preferably absorb or filter out as far as possible all areas of the infrared spectrum used for heating, whereby as little as possible or no infrared radiation can pass through and thus reach the photosensitive material itself.

By the fact that the material support according to the invention is heated without contact and by radiation-induced energy transfer, it is avoided that the photosensitive (and always temperature-labile) starting material is irradiated directly with infrared radiation. This has the advantage that (in contrast to electrically conductive transparent films—e.g. ITO coating) high heating power can be achieved. Furthermore, the indirect irradiation can preclude early thermally-induced and uncontrolled polymerization of the photosensitive material as a result of its own infrared absorption (and the resulting uncontrolled additional heating). Since the heat transfer between the material support and the photosensitive starting material takes place only by way of pure heat conduction as far as possible, the maximum temperature of the photosensitive starting material can be controlled very precisely via the temperature of the material support. This works the better, the thinner the layers of the starting material are used in the process. In addition, the elimination of non-transparent resistance heating elements (which can be used only outside the actual exposure zone) leads, above all, to the fact that a homogeneous process temperature can be set and maintained over the entire construction field or the entire material support.

A preferred embodiment provides that the radiation of the second radiation source is applied to the material support from the direction of the first radiation, so that the material support is heated from below.

In order to achieve uniform heating of the material support over as large a surface as possible, the largest possible area of the material support should be irradiated by means of the second radiation source, namely in particular at least that region of the material support which is coated by the material to be solidified. A further preferred method provides in this context for the radiation of the second radiation source to be directed to the region of the material support that is transparent to the radiation of the first radiation source.

The material support can for example consist of an infrared-absorbing glass or glass laminate, which meets the above requirements and is optionally provided on the upper and/or the lower side with special coatings. For example, these coatings can serve the purpose of enhanced infrared reflection.

Preferably, a coating of the material support may be provided, which supports the stereolithography process itself. For example, a coating facilitating the layer separation by reducing the surface adhesion, such as, e.g., a PTFE coating, may be provided. Reduced pull-off forces can also be achieved with a silicone coating.

According to a preferred embodiment, the radiation source of the second radiation is designed as an infrared radiation source with an emitter annealing temperature between 100° C. and 5,000° C., preferably between 500° C. and 3,000° C.

Preferably, the irradiation of the material support with the electromagnetic radiation of the second radiation source is carried out for heating the material support to a temperature of 40° C.-300° C., preferably 40° C.-150° C. Thereby, the solidifiable material can be uniformly heated in a simple manner to a temperature of at least 40° C.

The process according to the invention is particularly useful in the case of solidifiable materials, which have a viscosity of at least 15 Pa·s, preferably at least 20 Pa·s, at room temperature (20° C.). By the inventively achieved heating of the solidifiable material, the viscosity is significantly reduced, in particular to a dynamic viscosity of <5 Pa·s.

One is faced with a high viscosity of the starting material in particular in the processing of filled solidifiable materials (slip). Here, a sinterable material (e.g. ceramic or metal) in powder form is added to a viscous, photosensitive resin. During curing, the cured polymer acts as a binder. After the construction of the shaped body is completed, the cured polymer can be thermally removed and then the remaining filler material (e.g. a ceramic powder) is sintered together into a solid structure. This method makes it possible to use all the advantages of additive manufacturing for materials that would not be suitable for these processes. The degree of filling, i.e. the proportion of powder in the slip, is one of the most important factors regarding processability and material quality.

In general, pure polymers or polymer blends, as well as filled polymers (composites) may be considered as the solidifiable material. Filled polymers (green bodies), which serve as starting objects for the production of ceramic or metallic products, are also included. Preferably, an unfilled photopolymerizable material or a photopolymerizable material that is filled with a filler, in particular ceramic or metal powder, may be used.

The quantity of the heat flow to the solidifiable material depends on the temperature difference between the material support and the solidifiable material as well as on the thermal conductivity coefficients of the materials used. Here, the specific heat capacity and thermal conductivity, or the respective heat transfer coefficient of the material support and the solidifiable material are to be mentioned, and the total area available for heat exchange is to be taken into account. In the heating of thin layers of the solidifiable material, a rapid approximation as far as possible to the temperature of the material support is to be expected. The process control can thus be done either by calculation and accurate knowledge of the heat flows within the system under consideration or simply by temperature measurement of the material support. The required radiant energy of the second radiation source is controlled by a control system, which uses, for example, the temperature of the material trough bottom as an actuating variable. The temperature measurement itself can be done either by means of temperature sensors in selected areas of the material support or by means of contactless infrared measurement. Likewise, the layer temperature of the solidifiable material itself can be measured and used as an actuating variable. The stereolithographic additive structuring process can therefore be performed as long as desired at a precisely defined material temperature.

In this context, a preferred embodiment of the method according to the invention provides that the temperature of the material support and/or of the solidifiable material is measured and the radiation power of the second radiation source is controlled in dependence on the measured temperature values.

As already mentioned, the construction process is preferably carried out in layers. In this case, the method can be carried out in such a way that successively shaped body layers are formed one above the other, each by forming a material layer of predetermined thickness on the material support and by lowering a building platform or the shaped body that has at least partially been formed on the building platform into the material layer so that a layer of the material to be solidified is formed between the building platform or the shaped body and the material support, which is solidified by irradiation to form the desired shape of the shaped body layer.

The material support is preferably formed as the bottom of a trough that receives the solidifiable material. Alternatively, the material support can also be designed as a foil.

The described material support can also be designed to be movable, if this supports the layer application of the solidifiable material.

According to a further aspect of the invention, an apparatus for the lithograph-based additive production of three-dimensional shaped bodies is provided, comprising a first radiation source of electromagnetic radiation and a material support that, at least in a region thereof, is permeable for the radiation of the first radiation source and that is provided for supporting a material solidifiable by the action of the radiation, further comprising a building platform, which is held at an adjustable height above the material support, a first irradiation unit that comprises the first radiation source and that is controllable for the location-selective irradiation of material located between the building platform and the material support from below through the material support, and a heating device for heating the material located between the building platform and the material support, characterized in that the heating device comprises a second irradiation unit with a second radiation source of electromagnetic radiation directed to the material support and that the material support is substantially impermeable for the radiation of the second radiation source.

A preferred embodiment of the device provides that the radiation of the first radiation source comprises a first wavelength range and the radiation of the second radiation source comprises a second wavelength range that is different from, in particular non-overlapping with the first wavelength range.

The radiation of the first radiation source is, for example, in the wavelength range of 200-900 nm, in particular 300-400 nm or 400-480 nm, and the radiation of the second radiation source is preferably in the infrared spectrum, in particular in the wavelength range of 900-15.000 nm.

A further preferred embodiment of the device provides that the second irradiation unit is arranged such that the radiation of the second radiation source is applied to the material support from the direction of the first radiation.

A preferred embodiment of the device provides that the radiation of the second radiation source is directed onto the region of the material support that is transparent to the radiation of the first radiation source.

A preferred embodiment of the device provides that the material support, on the side coated by the solidifiable material and/or on the side facing away from the solidifiable material, carries a layer that at least partially absorbs or reflects the radiation of the second radiation source.

A preferred embodiment of the device provides that a temperature sensor for measuring the temperature of the material support and/or the solidifiable material is provided, which cooperates with a control unit for controlling the heating power of the second irradiation unit such that a predetermined temperature of the material support or the solidifiable material can be achieved and/or maintained.

A layered structure of the shaped body is preferably achieved in that a control unit co-operating with the first irradiation unit is designed to solidify in successive irradiation steps superimposed layers on the building platform each with a predetermined geometry by controlling the first irradiation unit and to adjust, after each irradiation step for a layer, the relative position of the building platform to the material support so as to successively abuild the shaped body in the desired shape.

Preferably, a movably guided doctor blade and a drive unit for reciprocating the doctor blade under the building platform are provided, in order to form a layer of predetermined thickness of the solidifiable material between two irradiation steps in each case, or the material support itself can be movably guided under a stationary doctor blade or a coating unit.

BRIEF DESCRIPTION OF DRAWINGS

The invention will be explained in more detail with reference to embodiments schematically shown in the drawing. Therein.

DETAILED DESCRIPTION

Figure 1:
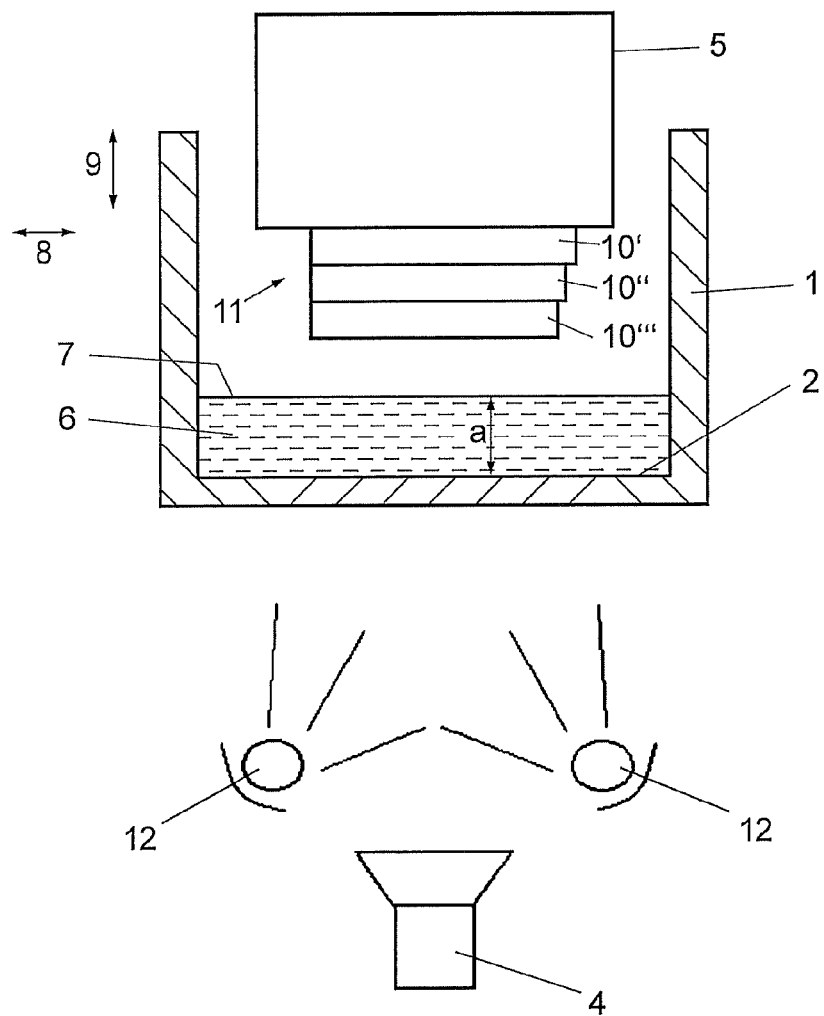
FIGS. 1 to 3 show schematic lateral sectional views of a device according to the invention in successive phases of the process sequence.

The operation of a device for carrying out a method of the present invention will first be described with reference to FIGS. 1 to 3, which show, with the exception of the heating of the solidifiable material, a device known per se from EP 2505341 A1. The device located in air or another gas atmosphere has a trough 1, the trough bottom 2 of which forms a material support and is transparent or translucent at least in a partial region 3. This partial region 3 of the trough bottom comprises at least the extent of a first irradiation or exposure unit 4, which is arranged under the trough bottom 2. The irradiation unit 4 has a first radiation source not shown in detail and a light modulator, with which the intensity can be controlled by a control unit and adjusted in a location-selective manner to produce an irradiation field on the bottom of the trough 2 with the geometry desired for the layer to be momentarily formed.

Alternatively, a laser may also be used in the first irradiation unit whose light beam successively scans the irradiation field with the desired intensity pattern via a movable mirror that is controlled by a control unit.

Opposite the first irradiation unit 4, a building platform 5 is provided above the trough 1, which is supported by a lifting mechanism, not shown, so that it is held in a height-adjustable manner above the trough bottom 2 in the area above the irradiation unit 4. The building platform 5 can also be transparent or translucent.

In the trough 1 there is a bath of radiation-solidifiable, in particular photopolymerizable material 6. The material level 7 of the bath is defined by a suitable element, such as a doctor blade, which applies the material uniformly in a certain material layer thickness a on the trough bottom 2. The trough 1 may for example be associated with a guide rail on which a carriage is guided displaceably in the direction of the double arrow 8. A drive provides for the reciprocation of the carriage, which has a holder for a doctor blade. The holder has, for example, a guide and an adjusting device in order to adjust the doctor blade in the direction of the double arrow 9 in the vertical direction. Thus, the distance of the lower edge of the blade from the bottom 2 of the trough 1 can be adjusted. The doctor blade is used when the building platform is in the raised state as shown in FIG. 1 and serves to distribute the material 6 evenly while setting a predetermined layer thickness. The layer thickness of the material 6 resulting from the material distribution process is defined by the distance of the lower edge of the doctor blade from the bottom 2 of the trough 1, as well as by the moving speed of the doctor blade.

Figure 2:
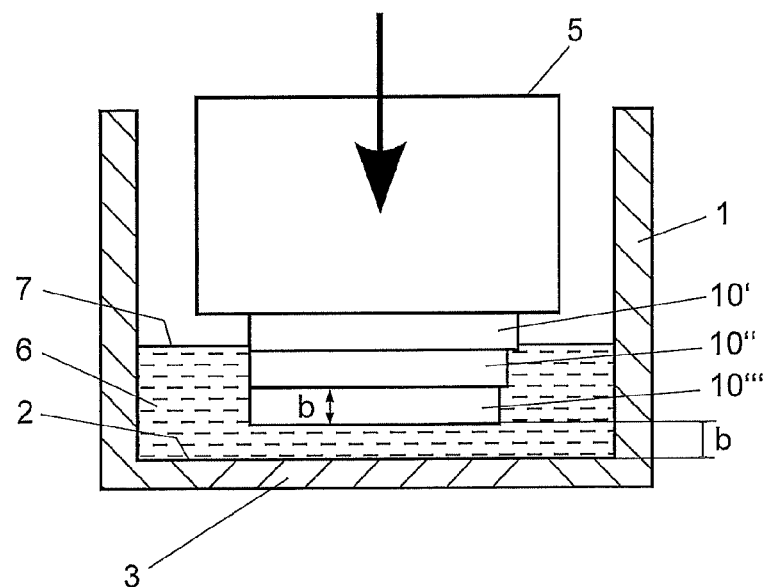

The resulting material layer thickness a is greater than the shaped body layer thickness b (FIG. 2). To define a layer of photopolymerizable material, the procedure is as follows. As shown in FIG. 2, the building platform 5, on which shaped body layers 10', 10'' and 10''', which form the shaped body 11, have already been formed, is lowered in a controlled manner by the lifting mechanism, so that the underside of the lowest shaped body layer 10''' first touches the surface of the material bath 6 having the height a, then dips in and approaches the trough bottom 2 so far that exactly the desired shaped body layer thickness b remains between the lower side of the lowest shaped body layer 10''' and the trough bottom 2. During this dipping process photopolymerizable material is displaced from the gap between the bottom of the building platform 5 and the trough bottom 2. As soon as the shaped body layer thickness b has been attained, the location-selective irradiation that is specific for this shaped body layer takes place in order to solidify the shaped body layer 10''' in the desired shape. After the formation of the shaped body layer 10'''', the building platform 5 is raised again by means of the lifting mechanism, which brings about the state shown in FIG. 3. The photopolymerizable material 6 is no longer present in the irradiated area.

These steps are subsequently repeated several times in order to obtain further shaped body layers 10 of photopolymerizable material. The distance between the lower side of the last-formed shaped body layer 10 and the trough bottom 2 is set to the desired shaped body layer thickness b, and then the photopolymerizable material is cured location selectively in the desired manner.

Figure 3:
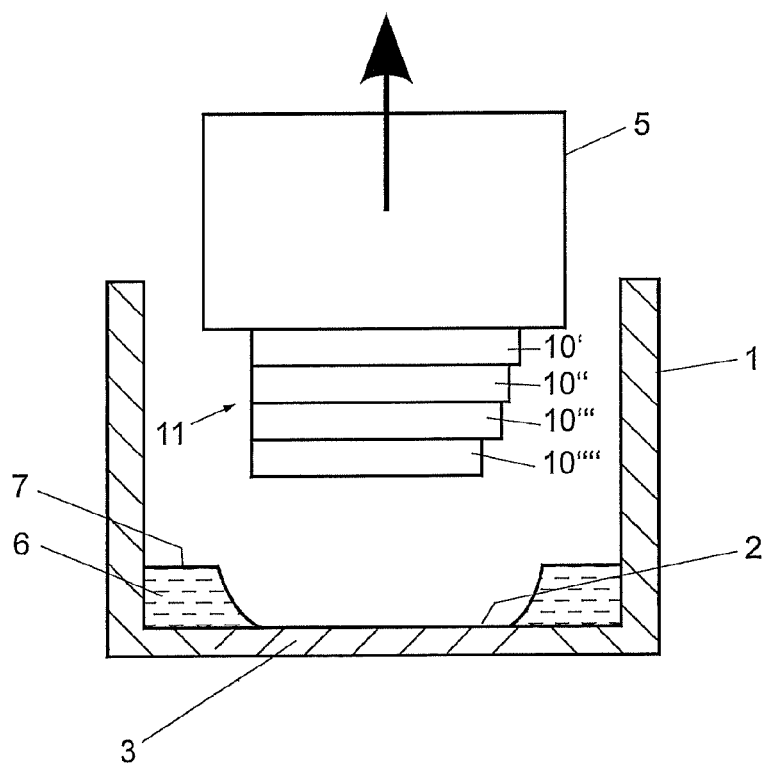

After lifting the building platform 5 after an irradiation step, there is a material deficit in the irradiated area, as indicated in FIG. 3. This is due to the fact that after solidification of the layer having the thickness a, the material is solidified from this layer and lifted together with the building platform 5 and the part of the shaped body already formed thereon. The thus missing photopolymerizable material between the lower side of the already formed shaped body and the trough bottom 2 must be filled from the mass of the photopolymerizable material 6 from the area surrounding the irradiated area. Due to the high viscosity of the material, however, this does not naturally flow back into the irradiated area between the lower side of the shaped body part and the trough bottom, so that material sinks or "holes" can remain here. The feeding of material into the material sink is effected by the material distribution effected by the doctor blade described above.

In order to facilitate the feeding of photopolymerizable material 6 into the material sinks, a heating of the material

6 is provided according to the invention, for which purpose one, preferably two, second radiation source(s) 12 (see FIG. 1) is/are arranged below the trough 1, whose radiation is directed to the trough bottom 2.

The at least one second radiation source 12 may be arranged next to or above the first irradiation unit 4. The radiation, in particular infrared radiation of the second radiation source 12 now causes a uniform heating of the trough bottom 2, wherein it is largely absorbed by the latter. The photosensitive material 6 itself is only partially or not heated by residues of the infrared radiation passing through the trough bottom 2. These possibly occurring "radiation residues" can occur both in the form of individual IR spectral regions or else in the form of a strongly attenuated total spectrum, but in the ideal case no longer lead to significant heating of the photosensitive material 6 itself. The relevant heating of the photosensitive material 6 therefore takes place directly via heat conduction between the trough bottom 2 and the photosensitive material 6 itself, wherein, of course, the higher temperature trough bottom 2 gives off heat to the photosensitive material 6.

Figure 4:
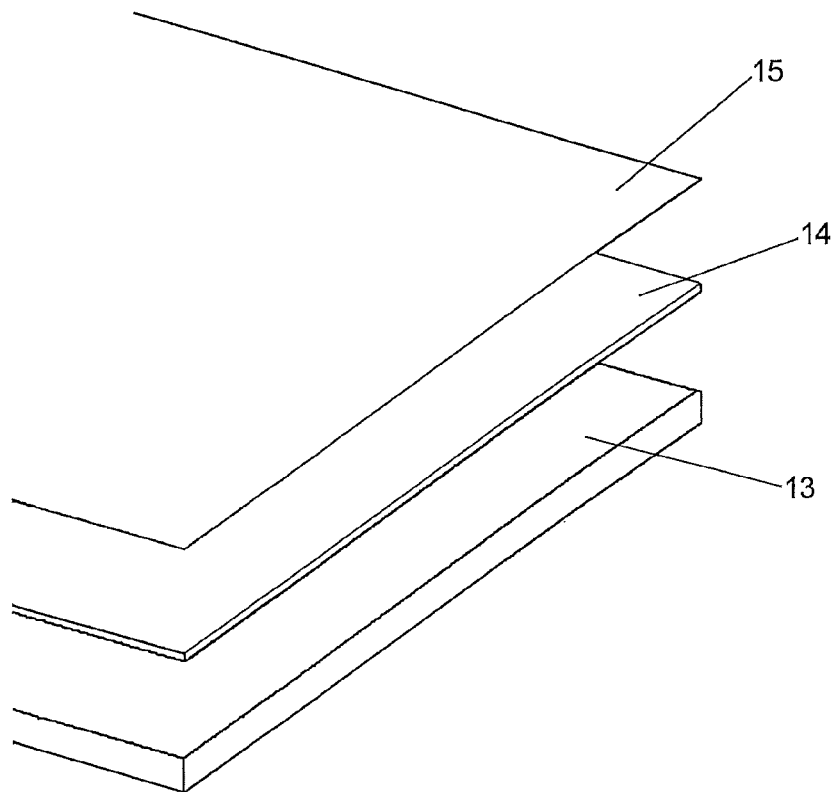
FIG. 4 shows the layer structure of the trough bottom.

FIG. 4 shows an example of a possible layer structure of the trough bottom 2. The base of the trough bottom 2 is formed by a partially transparent plate 13, which is made substantially non-transparent to radiation of the second radiation source, in particular radiation of the infrared spectrum, and largely transparent to radiation of the light used for structuring the photosensitive material. Examples of suitable materials for this partially transparent plate include special optical glasses (heat shield glasses, short-pass filters, etc.).

A silicon layer 14 of defined thickness may be applied over this plate 13 in order to reduce the detachment forces occurring during the additive construction process when the hardened layers 10 are separated from the trough bottom 2. Likewise, an FEP or PTFE coating 15 or a foil 15 can also be applied to this silicone layer 14 in order to further reduce the abovementioned detachment forces. In addition, other films can be incorporated in such a laminate, for example, to cause additional optical filter properties, or to reinforce existing filter effects.

The invention claimed is:

1. A method for the lithography-based generative production of three-dimensional shaped bodies, wherein material that is solidifiable by exposure to electromagnetic radiation is present on a material support that is permeable in at least a region thereof, a building platform is positioned at a distance from the material support, the material located between the building platform and the material support is heated and in the heated state is location-selectively irradiated by a first radiation source and solidified, wherein the electromagnetic radiation is introduced into the material through the material support that is permeable in at least a region thereof to radiation from the first radiation source, wherein the heating of the material is performed by irradiating the material support with electromagnetic radiation of a second radiation source, the radiation from the second radiation source being absorbed by the material support sufficiently to heat the material support to a temperature of 40-300° C., and wherein the electromagnetic radiation of the second radiation source is directed to the region of the material support that is transparent to the radiation of the first radiation source, and wherein the electromagnetic radiation of the second radiation source thereby causes the material support and the material on the material support to be heated uniformly.

2. The method according to claim 1, wherein the radiation of the first radiation source comprises a first wavelength range and the radiation of the second radiation source comprises a second wavelength range, which is different from the first wavelength range and in particular does not overlap with the same, wherein the radiation of the first radiation source is in the wavelength range of 200-900 nm and the radiation of the second radiation source is in the infrared spectrum.

3. The method according to claim 1, wherein the radiation of the second radiation source is applied to the material support from the direction of the first radiation.

4. The method according to claim 1, wherein the material support is substantially impermeable for the radiation of the second radiation source.

5. The method according to claim 1, wherein the material support, on the side coated by the material and/or on the side facing away from the material, carries a layer that at least partially absorbs or reflects the radiation of the second radiation source, or the material support itself consists of a building material with such an absorption property.

6. The method according to claim 1, wherein the solidifiable material has a viscosity of at least 15 Pa·s at room temperature (20° C.).

7. The method according to claim 1, wherein the solidifiable material is heated to a temperature of at least 40° C.

8. The method according to claim 1, wherein the temperature of the material support and/or of the solidifiable material is measured and the radiation power of the second radiation source is controlled in dependence on the measured temperature values.

9. The method according to claim 1, wherein the shaped body is built up in layers, wherein successively shaped body layers are formed one above the other, each by forming a material layer of predetermined thickness on the material support and by lowering a building platform or the shaped body that has at least partially been formed on the building platform into the material layer so that a layer of the material to be solidified is formed between the building platform or the shaped body and the material support, which is solidified by irradiation to form a desired shape of the shaped body layer.

10. A method for the lithography-based generative production of three-dimensional shaped bodies, wherein material that is solidifiable by exposure to electromagnetic radiation is present on a material support that is permeable in at least a region thereof, a building platform is positioned at a distance from the material support, the material located between the building platform and the material support is heated and in the heated state is location-selectively irradiated by a first radiation source and solidified, wherein the electromagnetic radiation is introduced into the material through the material support that is permeable in at least a region thereof to radiation from the first radiation source, wherein the heating of the material is performed by irradiating the material support with electromagnetic radiation of a second radiation source, wherein the material support carries a layer that at least partially absorbs or reflects the radiation from the second radiation source sufficiently to heat the material support to a temperature of 40-300° C., and wherein the electromagnetic radiation of the second radiation source is directed to the region of the material support that is transparent to the radiation of the first radiation source, and wherein the electromagnetic radiation of the second radiation source thereby causes the material support and the material on the material support to be heated uniformly.

11. A device for the lithograph-based additive production of three-dimensional shaped bodies for carrying out a method according to claim 1, comprising a first radiation source of electromagnetic radiation and a material support that, at least in a region thereof, is permeable for the radiation of the first radiation source and that is provided for supporting a material solidifiable by the action of the radiation, further comprising a building platform, which is held at an adjustable distance from the material support, a first irradiation unit that comprises the first radiation source and that is controllable for the location-selective irradiation of the material located between the building platform and the material support through the material support, and a heating device for heating the material located between the building platform and the material support, wherein the heating device comprises a second irradiation unit with a second radiation source of electromagnetic radiation directed to the material support, the radiation from the second radiation source being absorbed by the material support sufficiently to heat the material support to a temperature of 40-300° C., and wherein the electromagnetic radiation of the second radiation source is directed to the region of the material support that is transparent to the radiation of the first radiation source, and wherein the electromagnetic radiation of the second radiation source thereby causes the material support and the material on the material support to be heated uniformly.

12. The device according to claim 11, wherein the radiation of the first radiation source comprises a first wavelength range and the radiation of the second radiation source comprises a second wavelength range that is different from, in particular non-overlapping with the first wavelength range, wherein the radiation of the first radiation source is in the wavelength range of 200-900 nm and the radiation of the second radiation source is in the infrared spectrum.

13. The device according to claim 11, wherein the second irradiation unit is arranged such that the radiation of the second radiation source is applied to the material support from the direction of the first radiation.

14. The device according to claim 11, wherein the material support is substantially impermeable for the radiation of the second radiation source.

15. The device according to claim 11, wherein material support, on the side coated by the solidifiable material and/or on the side facing away from the solidifiable material, carries a layer that at least partially absorbs or reflects the radiation of the second radiation source, or the material support itself consists of a building material with such an absorption property.

16. The device according to claim 11, wherein a temperature sensor for measuring the temperature of the material support and/or the solidifiable material is provided, which cooperates with a control unit for controlling the heating power of the second irradiation unit such that a predetermined temperature of the material support or the solidifiable material can be achieved and/or maintained.

17. The device according to claim 11, wherein a control unit co-operating with the first irradiation unit is designed to solidify in successive irradiation steps superimposed layers on the building platform each with a predetermined geometry by controlling the first irradiation unit and to adjust, after each irradiation step for a layer, the relative position of the building platform to the material support so as to build successively the shaped body in a desired shape.

18. The device according to claim 11, wherein a movably guided doctor blade and a drive unit for reciprocating the doctor blade under the building platform are provided, in order to form a layer of predetermined thickness of the solidifiable material between two irradiation steps in each case, or the material support itself can be movably guided under a stationary doctor blade or coating unit.

19. A device for the lithograph-based additive production of three-dimensional shaped bodies for carrying out a method according to claim 10, comprising a first radiation source of electromagnetic radiation and a material support that, at least in a region thereof, is permeable for the radiation of the first radiation source and that is provided for supporting a material solidifiable by the action of the radiation, further comprising a building platform, which is held at an adjustable distance from the material support, a first irradiation unit that comprises the first radiation source and that is controllable for the location-selective irradiation of the material located between the building platform and the material support through the material support, and a heating device for heating the material located between the building platform and the material support, wherein the heating device comprises a second irradiation unit with a second radiation source of electromagnetic radiation directed to the material support, wherein the material support carries a layer that at least partially absorbs or reflects the radiation from the second radiation source sufficiently to heat the material support to a temperature of 40-300° C., and wherein the electromagnetic radiation of the second radiation source is directed to the region of the material support that is transparent to the radiation of the first radiation source, and wherein the electromagnetic radiation of the second radiation source thereby causes the material support and the material on the material support to be heated uniformly.

\* \* \* \* \*